United States Patent
Green et al.

[11] Patent Number: 5,979,567
[45] Date of Patent: Nov. 9, 1999

[54] FRONT MOUNTED MECHANICAL ROW CROP GUIDANCE SYSTEM

[76] Inventors: Manvel Green, R.R.. 2, Box 14; Robert Green, P.O. Box 183, both of St. Thomas, N. Dak. 58276

[21] Appl. No.: 08/725,269

[22] Filed: Oct. 2, 1996

Related U.S. Application Data

[63] Continuation of application No. 08/236,962, May 2, 1994, abandoned.

[51] Int. Cl.$^6$ .................................................. A01B 69/00
[52] U.S. Cl. .............................. 172/26; 172/833; 180/401
[58] Field of Search ................................. 172/5, 26, 134, 172/190, 191, 833, 516; 180/401, 209, 300, 301, 312; 104/244.1

[56] References Cited

U.S. PATENT DOCUMENTS

| | | | |
|---|---|---|---|
| 1,198,088 | 9/1916 | Waite | 104/244.1 |
| 1,331,403 | 2/1920 | Thompson | 104/244.1 |
| 1,444,224 | 2/1923 | Wagner | 172/604 |
| 1,607,186 | 11/1926 | Creamer | 104/244.1 |
| 1,977,273 | 10/1934 | Hansen | 104/244.1 |
| 2,240,994 | 5/1941 | Love | 172/604 |
| 2,759,407 | 8/1956 | Kelley | 104/244.1 |
| 2,778,181 | 1/1957 | Gray | 180/15 |
| 2,818,139 | 12/1957 | Sutter | 181/15 |
| 3,049,181 | 8/1962 | Oerman et al. | 172/298 |
| 3,306,368 | 2/1967 | Rosenvold | 172/833 |
| 3,756,326 | 9/1973 | Yordy | 172/298 |
| 3,840,076 | 10/1974 | Capehart | 172/1 |
| 4,117,889 | 10/1978 | Larson | 172/26 |
| 4,176,726 | 12/1979 | Schaeff | 180/15 |
| 4,298,084 | 11/1981 | Newell | 172/26 |
| 4,326,465 | 4/1982 | Forrest | 172/26 X |
| 4,367,802 | 1/1983 | Stiff et al. | 180/131 |
| 4,448,274 | 5/1984 | van der Lely | 180/15 |
| 4,871,026 | 10/1989 | Bernard | 172/26 |
| 5,103,924 | 4/1992 | Walker | 172/26 |
| 5,511,624 | 4/1996 | Dunn | 172/26 X |
| 5,603,380 | 2/1997 | Mansur | 172/26 |

FOREIGN PATENT DOCUMENTS

| | | | |
|---|---|---|---|
| 137344 | 2/1988 | U.S.S.R. | 172/26 |

*Primary Examiner*—Victor Batson
*Attorney, Agent, or Firm*—Curtis V. Harr

[57] ABSTRACT

A device for guiding farm equipment is disclosed. This device includes two trench forming chisel type devices attached to the planter or the initial implement used to set up the rows in a row type crop. These trenches are formed generally spaced to match the front wheels of the tractor on its next trip down the field. The tractor is subsequently supplied with a front mounted framework fastened to the front axle of the tractor. This framework supports two trench following lenticular discs capable of supporting a substantial amount of the tractors front weight. These discs may further be formed with a central rib. These trenches may be used in subsequent operations with implements of a smaller size by making the framework adjustable so as to allow the trench following discs to be placed at different widths as well as supplying structure for raising and lowering each guide independently.

5 Claims, 10 Drawing Sheets

FRONT MOUNTED MECHANICAL ROW CROP GUIDANCE SYSTEM

This application is a continuation of application Ser. No. 08/236,962, filed May 2, 1994, now abandoned.

BACKGROUND OF THE INVENTION

This invention relates generally to a trench forming and following device for attachment to a tractor, and more particularly to a method of guiding farm implements during operations involving row crops such as beets, corn and sunflowers.

Since the beginning of row crop farming, farmers have experimented with methods of guiding their equipment accurately and easily during the various row crop operations.

It is desirable to plant row crops in substantially straight and parallel rows as subsequent operations such as cultivating, spraying, roto-beeting and the lifting of beets require the operator to accurately follow the previously planted rows. Failure to follow these rows may cause damages ranging from uprooted seedlings while cultivating to the waste of chemical while engaged in spraying operations. The high degree of skill that is required to navigate during row crop operations may often cause drivers to become tired or lose concentration resulting in deviations from the previously planted rows.

A still further problem relates to the spacing of these rows. In order to maximize yield for a particular crop rows are spaced in varying widths from 18 to 30 inches. Tractors used in row crop farming generally have wheel width spacing that is adjustable. Thus, a guidance system to work properly in these situations must be designed to allow adjustment for the different widths of row crop spacing.

One method of guiding row crops has been the use of a first knife or chisel type implement to rip trenches parallel and between the rows of crop. These implements are generally mounted on the planter or first row crop operation in the crop cycle. During this initial operation the driver of the implement is free to follow the already planted rows or the outside of the field. During subsequent operations the tractor or the implement itself is supplied with a single lenticular disc center mounted so as to follow the aforementioned trench.

This disc can be mounted on the front of the tractor and pushed into the ground using hydraulics and the weight of the tractor to follow the previously made trench. The increasing size of farm operations and modernization of farm equipment has created some problems with this type of guidance system. The increase in row crop farming has resulted in the development of tractors that are designed to operate easily in a row crop environment. These tractors are often heavier and equipped with a mechanical front wheel drive which has resulted in the use of front tires that are no longer equipped with ribs running parallel to the direction of travel as old tractor tires were. These new tires are supplied with diagonal gripping ribs and are much larger than the old style of tires. The use of these heavier tractors with a mechanical front wheel drive and larger tires has rendered the placement of a single lenticular disc on the front of tractor obsolete for four reasons. The first reason is the size of the tractor; one disc is not sufficient to hold a substantial amount of the weight of the front of the tractor. Thus, the tires can easily steer the tractor and allow deviations from a straight course. The second problem is that the guidance disc is mounted to the tractor undercarriage. As the front axle oscillates to follow the contour of the ground, the undercarriage remains stationary, this causes the disc to turn side to side losing its contact with the trench which it is supposed to engage. The third problem is the size of the front wheels as they are now much larger, one trench following disc is insufficient to guide the larger implements. As the front driven wheels are turned, the single guidance disc is easily moved side to side losing contact with the guidance trench. The fourth problem with using one centrally mounted guidance disc is that it may cause instability in the tractor if two much weight is placed upon the disc.

Alternatively, the disc may be mounted upon the implement itself. In this set up, it is necessary to use implements that are not mounted on solid hitches so as to allow the implement to move side to side in order to allow the guidance disc to follow the trench. The problem with this set up is that a great majority of row crop implements are designed to be used with a solid three point hitch; use of this type of rear mounted guidance system requires that the farmer use implements mounted on a loose hitch that allows the implement to pivot, thus, a farmer may be required to change his whole equipment line in order to render this type of hitch feasible.

A second type of guidance system utilizes two parallel trench forming means generally made up of two lenticular discs. These discs are evenly spaced with the front wheels and mounted to the undercarriage of the tractor in front of the rear wheels and behind the front wheels. Ideally, in this guidance system the implement behind the tractor is equipped with a loose hitch and is supplied with two more trench following wheels. The use of the loose hitch allows the implement to move from side to side so as to follow the trenches and not necessarily the deviations that the tractor may make. In this guidance system, the trenches are also used on subsequent trips over the field. The trenches are evenly spaced so as to allow the front wheels of the tractor to engage said trenches on subsequent trips over the field.

This type of guidance system is also plagued with three types of problems that are caused by the new, large four wheel drive row crop tractors. The first problem is the loose hitch. As stated earlier, it is desirable to have a system that utilizes a locked or three point type hitch as this type of equipment represents the majority of row crow crop machinery in use today. The aforementioned guidance system requires a loose hitch so as to allow the implement to move from side to side to follow the trench and remove deviations made by the driver. The second problem with this system is that the trench forming discs are mounted to the undercarriage of the tractor. This requires them to move with the body of the tractor rather than to move independently as the wheels of the tractor move over changes in the contour of the ground. The third problem with this system is that subsequent trips over the field rely on the front tires of the tractor to follow the previously made trenches. This method may have worked with the older two wheel drive tractors which utilized the smaller front tires that were equipped with parallel ribs that helped to guide the tires through these trenches. However, today's larger four wheel drive row crop tractors are supplied with front tires utilizing diagonal ribs of a larger size. The use of the larger diagonally ribbed tires results in the front tires often climbing or jumping out the previously made trenches.

A still further problem with the aforementioned guidance method relates to the use of implements of varying sizes. The use of larger equipment has required the use of implements of varying sizes. Often it may be desirable to plant row crops with a twenty four row planter and later turn or cultivate the crop with a twelve row implement. This problem arises frequently with the planting, roto-beeting and lifting of sugar beets. A farmer can plant with twelve row implement and defoliate or roto-beet with a twelve row implement while lifting or harvesting can only be accomplished six rows at time. This particular type of operation causes problems with guidance systems as the tractor is not following the same tracks that it did during planting. One common application of the new guidance system is sugar beet farming. Sugar beets are planted in rows and require cultivating and spraying much as any other row crop. However, the harvesting of beets is much different than that of other typical row crops, and thus presents some unique problems. Before harvesting the beets must be defoliated in a process commonly called roto-beeting. A common size for this machine is a twelve row roto-beeter. During roto-beeting the front tractor tires are set 88" so as to traverse four 22" rows. To maximize sugar content, the beets must be dug or lifted within 8 hours of being defoliated. This is often accomplished with a six row harvester or lifter. The tractor pulling this harvester would have the front tires set at 88" spacing. Previously it was not possible to use the established tracks in the twelve row crop since this required the tractor wheels to spaced at 44" centers which is not possible with the large tractors used in today's operations. By making a guidance system with infinitely adjustable discs to be placed across any position in front of the tractor, they may be placed so one guidance disc can engage the original 88" guidance trenches from one direction while the opposite guidance disc is used from the opposite direction. It is very difficult to follow the rows manually after roto-beeting beating because the beet tops form an even carpet of green hiding the rows. This new guidance system allows even less experienced operators to run the harvester or lifter. The more accurately a lifter follows the beet rows, the shallower it can be placed. This allows for less power consumption and greater tractor speeds.

The present invention addresses the problem of accurately guiding four wheel drive row crop tractors and creates a method of covering previously trenched rows with an implement half of the size of the originally planting implement. The present invention also offers other advantages over the prior art and solves problems associated therewith.

SUMMARY OF THE INVENTION

In accordance with the present invention, a method of guiding four wheel drive row crop farm equipment is provided. The method comprises attaching a knife or trench digging chisel-type tool to the row crop planter and ripping two trenches parallel and evenly spaced so as to be aligned with the front wheels of the tractor. When subsequent operations such as cultivating or turning are done the tractor is equipped with a frame work designed to hold two lenticular discs able to engage the aforementioned guidance trenches ripped during the planting operation. These lenticular discs are placed so as to lead the front wheels of the tractor. The framework and the trench engaging discs are designed to support and remove much of the weight of the front wheels. The framework supporting the wheels is further attached to the front axle of the tractor rather then the undercarriage of the tractor. By attaching the framework to the front axle, the ground engaging guidance discs may follow the contour of the earth as do the front wheels of the tractor rather than moving with the tractor carriage itself. The framework supporting the discs is ideally supplied with two hydraulic cylinders to raise the guidance disc as well as to force them into the ground. Since the discs run out in front of the tractor and relieve much of the weight from the front wheels, these large tires are less likely to vary from side to side as it requires a greater amount of force to sway the entire system. A still further characteristic of the framework is adjustability as the frame is designed so as to allow the distance between the guidance wheels to be changed to follow changes made in the spacing of the front wheels of the tractor in order to accommodate rows of varying widths.

A still further variance in the above system may be made to the way that the hydraulic cylinders operate. In situations where the implement traveling the field is the same size as the planter, the hydraulic cylinders would be hooked up to raise in lower the two discs in tandem. In the situation where implements are used that are half of the size of the planter, it is desirable to have the hydraulic cylinders hooked up independently as well as to have the frame modified so as to allow the raising and lowering of each disc separately. In this type of situation the planter may be a twelve row planter thus the first trip down the field the front tires and trenches may correspond to rows four and a half and eight and a half. A subsequent trip over the field with a six row beet lifting attachment would require the adjustment of the guidance discs to run at rows two and a half and four and a half thus only one trench engaging disc would be used and the other disc would be raised out of operation. The next trip back down the field would require the reversal of the discs so as to engage the trench made at eight and half.

The use of the front mounted system also allows the farmer two use implements that are mounted with solid hitches as the tractor proper is stopped from varying between the rows, thus the implement does not need to move independently of the tractor.

The above described features and advantages of novelty are pointed out with particularity in the claims of the present application. However, for a better understanding of the present invention, reference should be made to the drawings in which there is illustrated and described preferred embodiments of the present invention.

DESCRIPTION OF THE PREFERRED EMBODIMENTS

Figure 1:
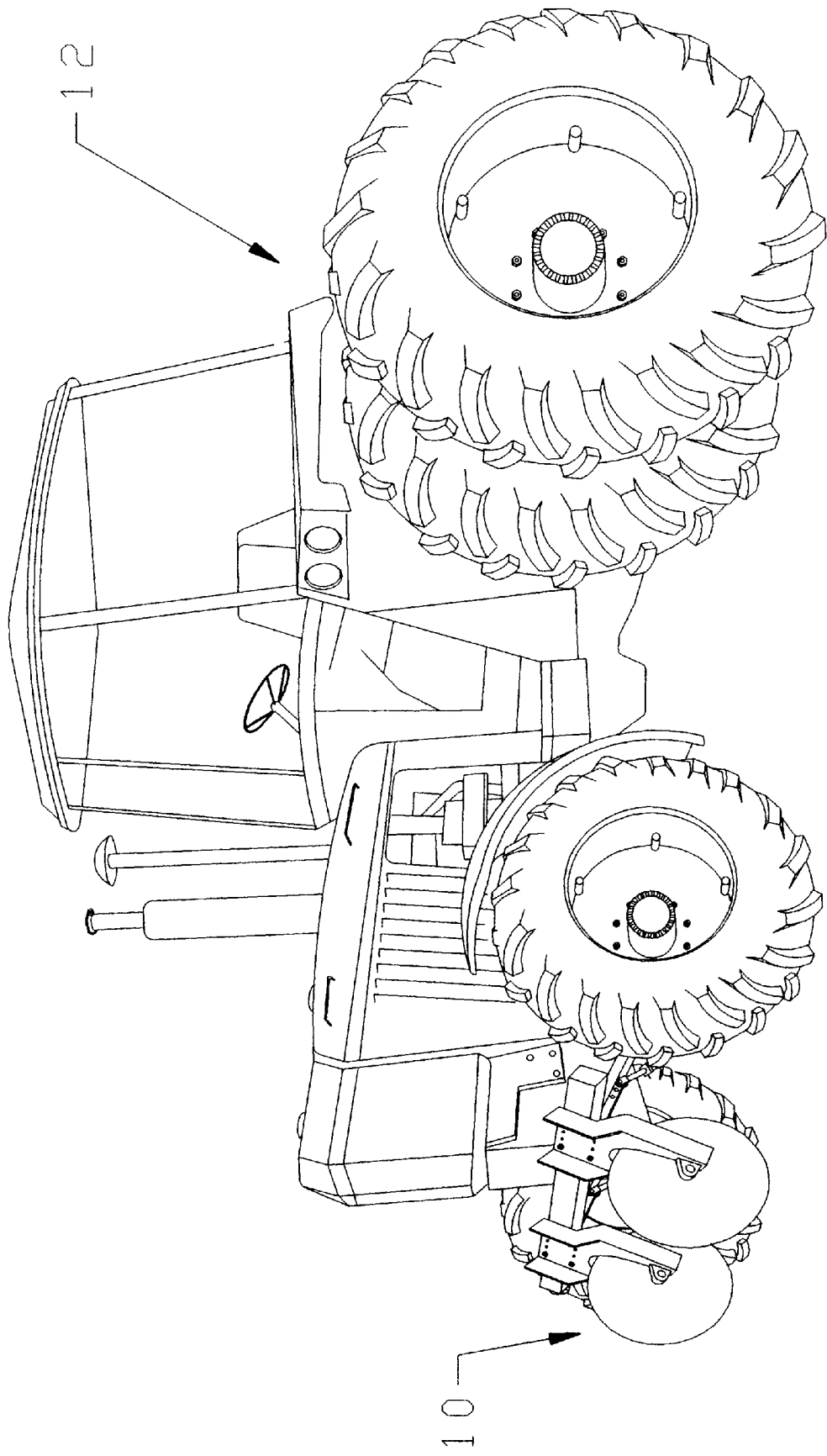
FIG. 1 is a perspective view of a front mounted row crop guidance system attached to a farm tractor. The guidance system is shown in its raised or retracted position.

Referring to the accompanying drawings, a front mounted row crop guidance system (10) is used in the planting and maintenance of row crops. In the illustrated embodiment, the front mounted row crop guidance system (10) comprises a pair of lenticular discs (14) mounted on a frame (20) which is in turn, by the means of a specially designed axle mount (42), mounted to the front axle of a farm tractor (12). It must be stated that the present invention may be equally applicable in other applications where it is advantageous to follow predetermined pathways while using heavy equipment in other farming and non-farming operations.

Figure 2:
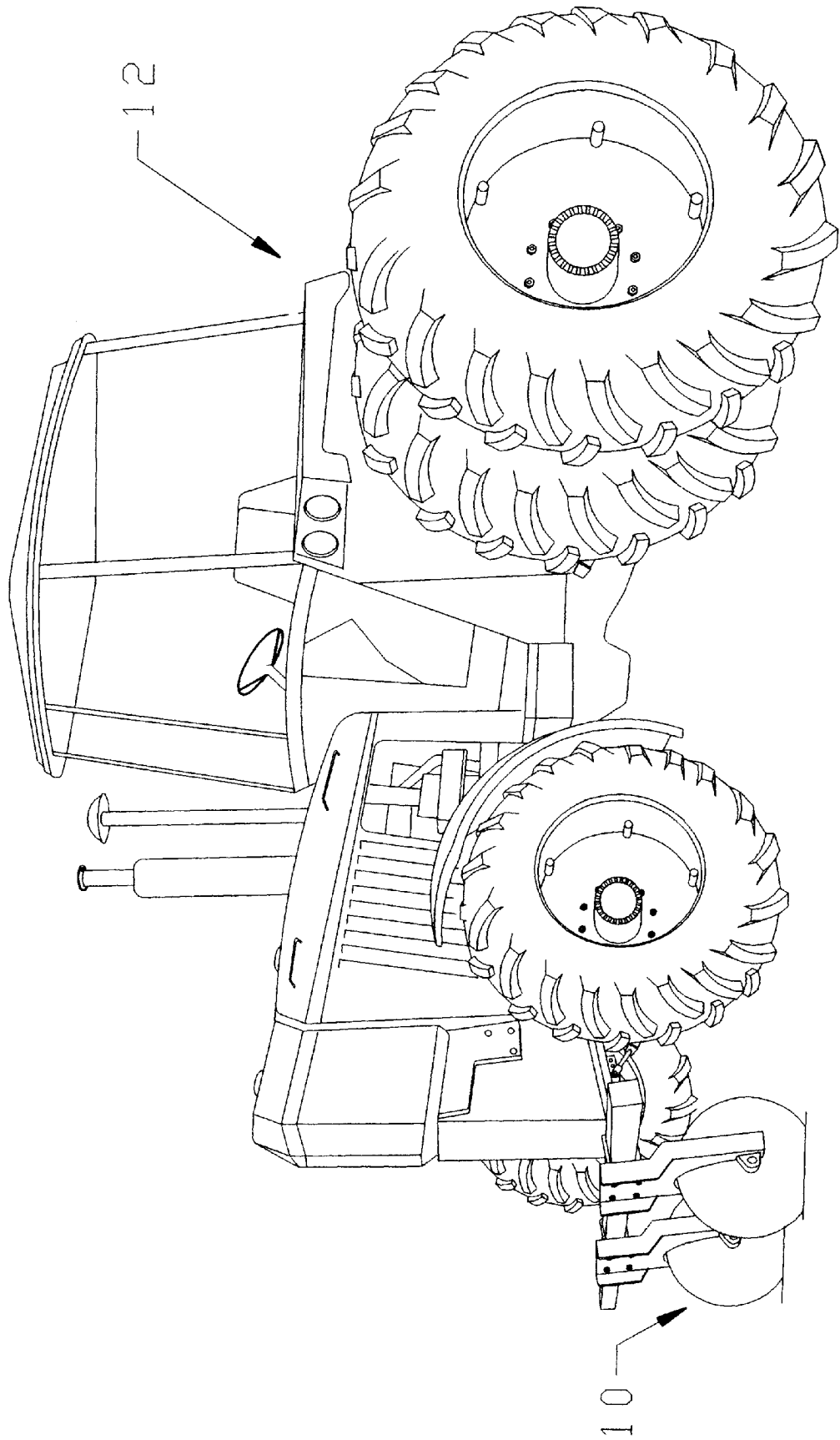
FIG. 2 is a perspective view of a front mounted row crop guidance system attached to a farm tractor. The guidance system is shown in its lowered or engaged position.

As shown by the accompanying drawings in FIGS. 1 and 2, the front mounted row crop guidance system (10) is attached to the front end of a farm tractor (12) with each of the lenticular discs (14) being mounted in front of and directly aligned with a front tire of the tractor (12). FIG. 1 shows the front mounted row crop guidance system (10) in its raised or retracted position which is the desired position when the present invention is not in use. FIG. 2 shows the front mounted row crop guidance system (10) in its lowered or engaged position which is the desired position when the present invention is intended to be put to use. In the latter position, the lenticular discs (14) are forced into the soil by pressure applied by the hydraulic cylinders (34) which has the effect of removing much of the weight from the front tires of the tractor (12).

During the planting, the cultivating, or any other necessary maintenance of row crops, the lenticular discs (14) of the present invention either follow and enlarge and compact grooves ripped in the soil by cutting blades attached to the planting implement during the operation, or during the initial planting operation itself, cut generally V-shaped trenches in the soil which the front tires of the tractor (12) follow. The importance of this is that with the wide-spread use of a three point or solid hitch in the attachment of farm implements to tractors (12) the implement towed by the tractor (12) will follow exactly in the path of the tractor (12). By establishing these trenches, which will remain in the soil for the course of the growing season, during the initial planting operation, any subsequent field operation using the present invention that is necessary may be performed easily without the danger of harming the growing crops by virtue of the front mounted row crop guidance system's (10) ability to follow any variations in the line of existing rows. This is facilitated by the lowering of the lenticular discs (14) thereby removing much of the tractor's (12) weight from the front tires. The front mounted row crop guidance system (10) is then free to follow any existing variations in the line of the row because the front tires of the tractor (12) will not resist any side to side movement necessary to follow the line. This also allows the operator of the tractor (12) to follow the line of the row perfectly with a minimal amount of effort.

Figure 3:
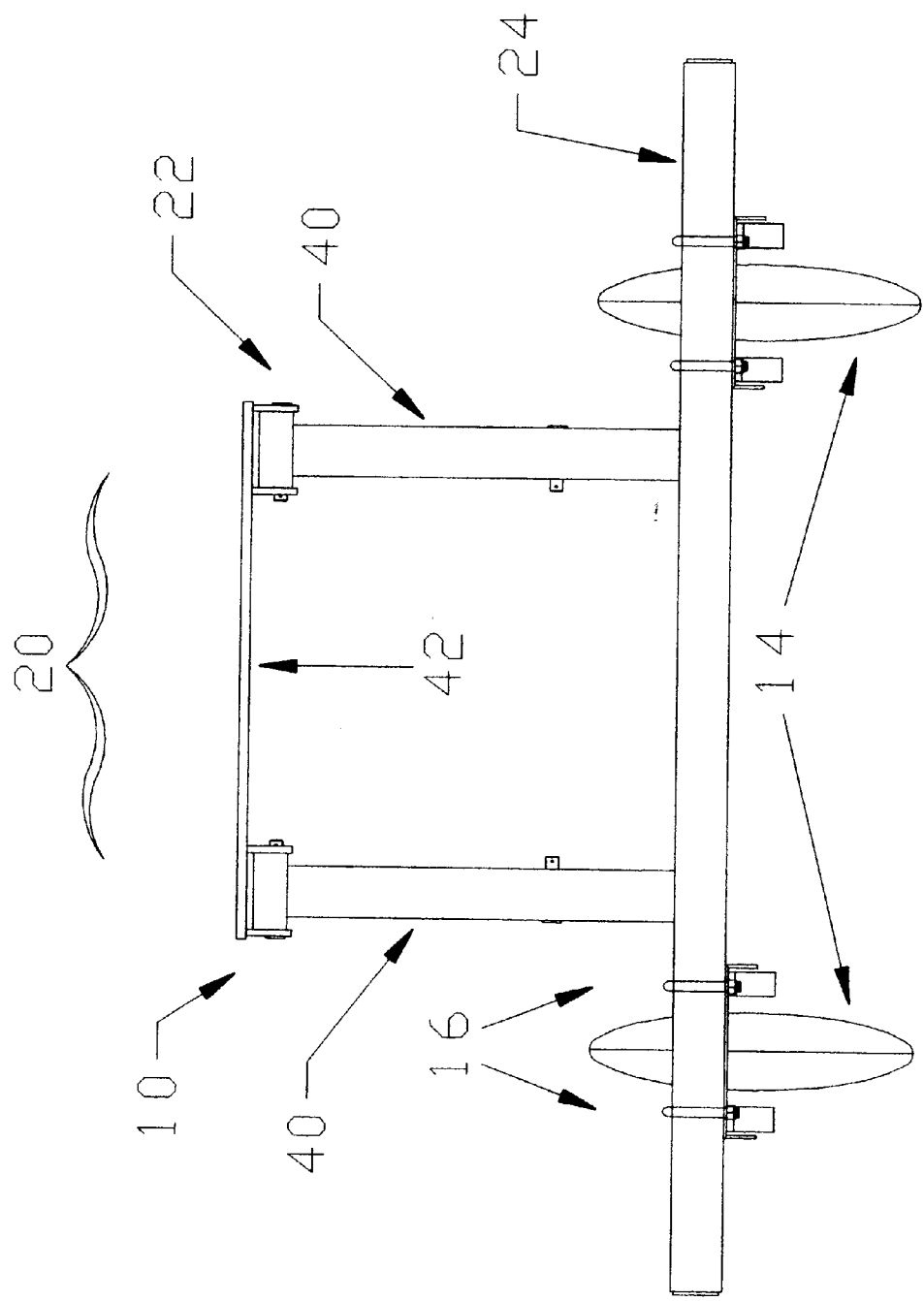
FIG. 3 is a top elevation view of the present invention showing the components of the system and their relationship to one another.
Figure 4:
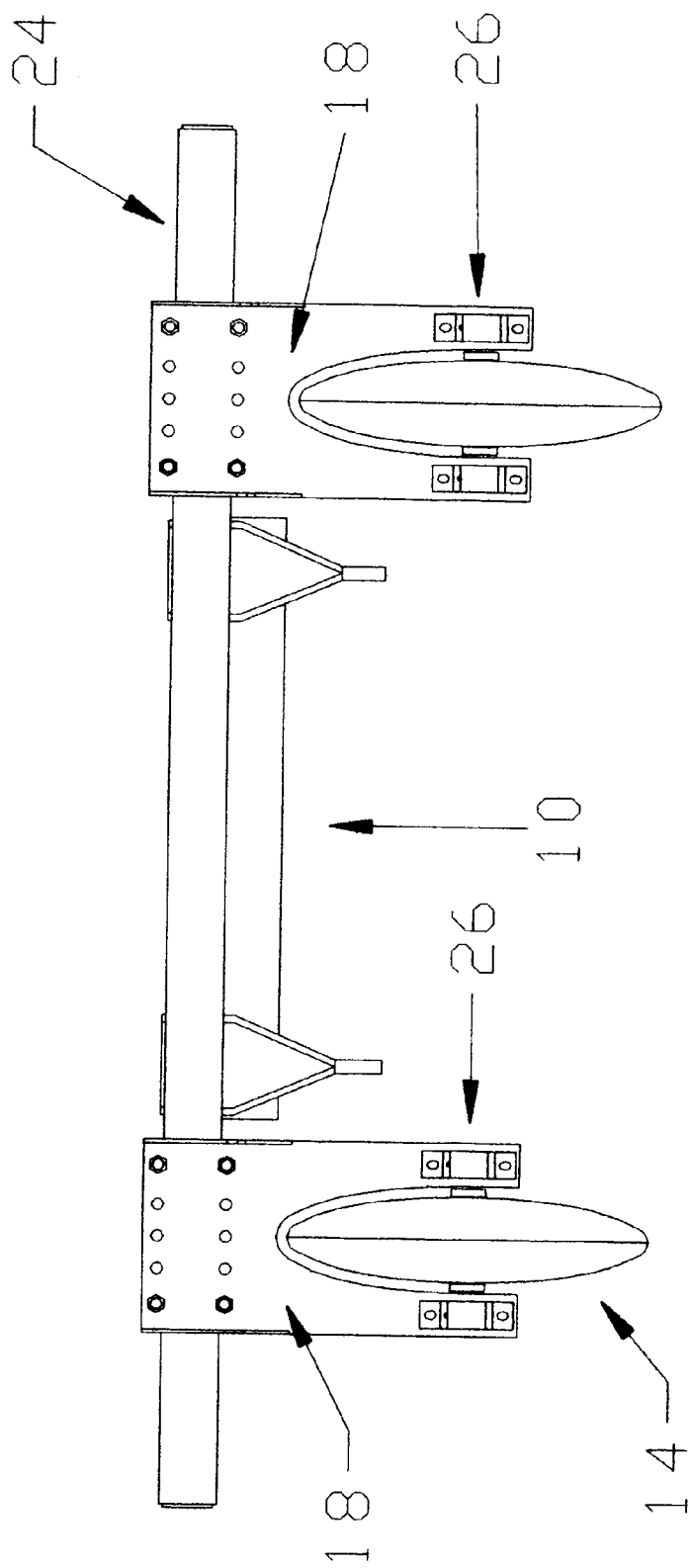
FIG. 4 is a front elevation view of the present invention showing the orientation of the lenticular discs to the body of the system.
Figure 5:
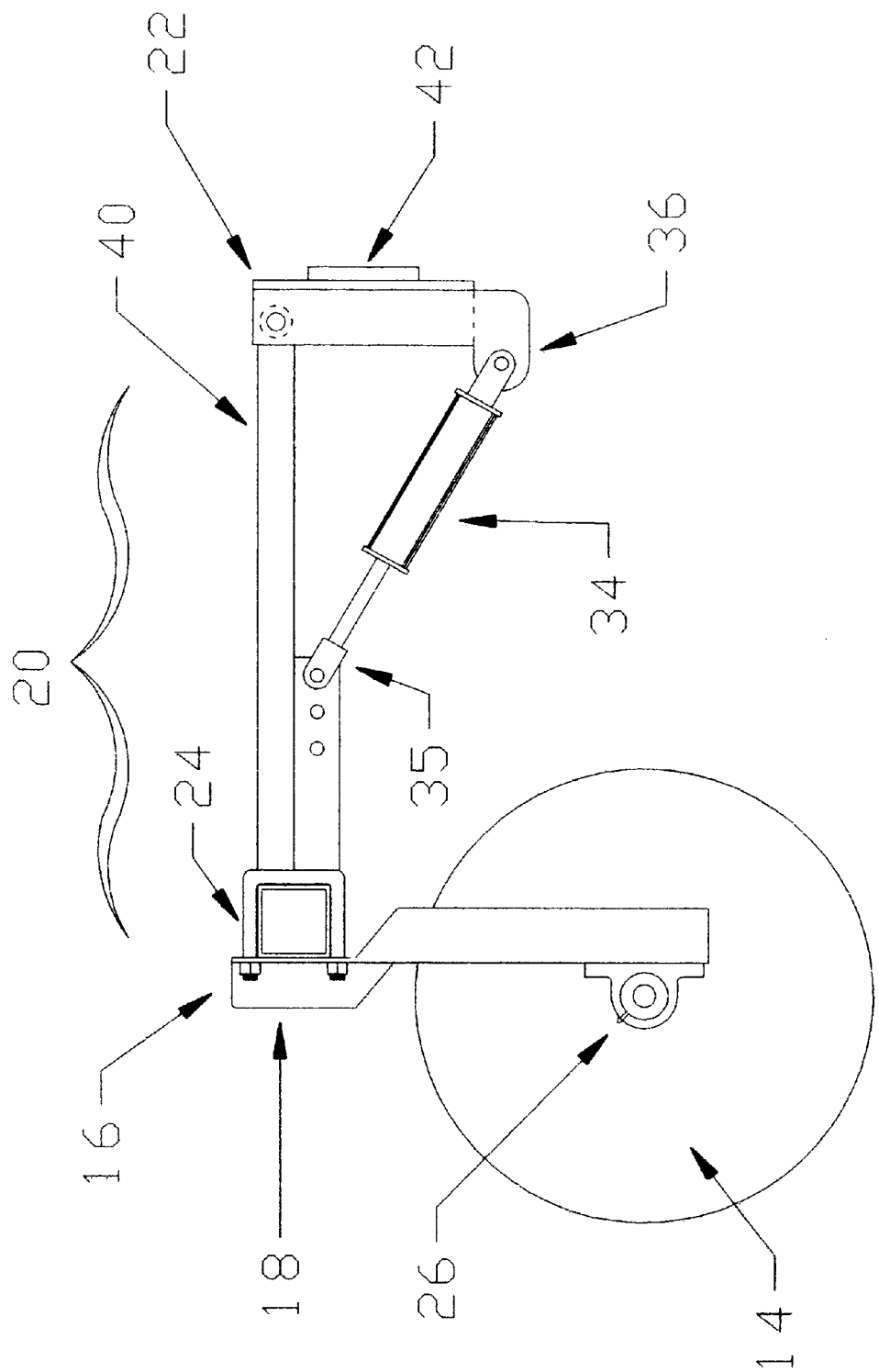
FIG. 5 is a side elevation view of the present invention showing the orientation of the lenticular discs and the hydraulic system to body of the system.

As shown by FIGS. 3, 4, and 5, the front mounted row crop guidance system is comprised of two lenticular discs (14) whose purpose is to cut and follow generally V-shaped trenches in the soil. The lenticular discs (14) are attached to the frame (20) of the present invention by the use of the lenticular disc support frames (18). This in turn is attached to the front cross member (24) of the frame (20) of the present invention by the use of adjustable U-bolt frame mounts (16). These adjustable U-bolt frame mounts (16) are easily adjustable along the length of the front cross member (24) to facilitate the use of the front mounted row crop guidance system (10) with tractors of varying makes and models having front tire spans of varying lengths.

The frame (20) of the present invention also consists of perpendicular frame members (40). These connect the body of the present invention to the axle mounts (42) at the furthest back point of the present invention. These axle mounts (42) are constructed in a manner that allows for the easy attachment of the front mounted row crop guidance system (10) to the front axles of varying makes and models of tractors that have front axles of differing designs and sizes. The back most end of the perpendicular frame members (40) are constructed with a hinge mount (22) which allows the frame (20) present invention to pivot in relation to the axle mounts (42) when the hydraulic cylinders (34) engage and disengage the lenticular discs (14).

The engaging or disengaging of the lenticular discs (14) is accomplished through the use of the hydraulic cylinders (34) as shown by FIG. 5. The hydraulic cylinders (34) are mounted to the frame (20) of the front mounted row crop guidance system (10) on the lower end of the cylinders by the use of a single, solid mount (36) which is in turn connected to the base of the axle mount (42). The upper mount (35) is adjustable and mounted to the bottom side of the perpendicular frame members (40) which allows for a variation in the amount of travel between the engaged and disengaged positions of the lenticular discs (14).

Figure 6:
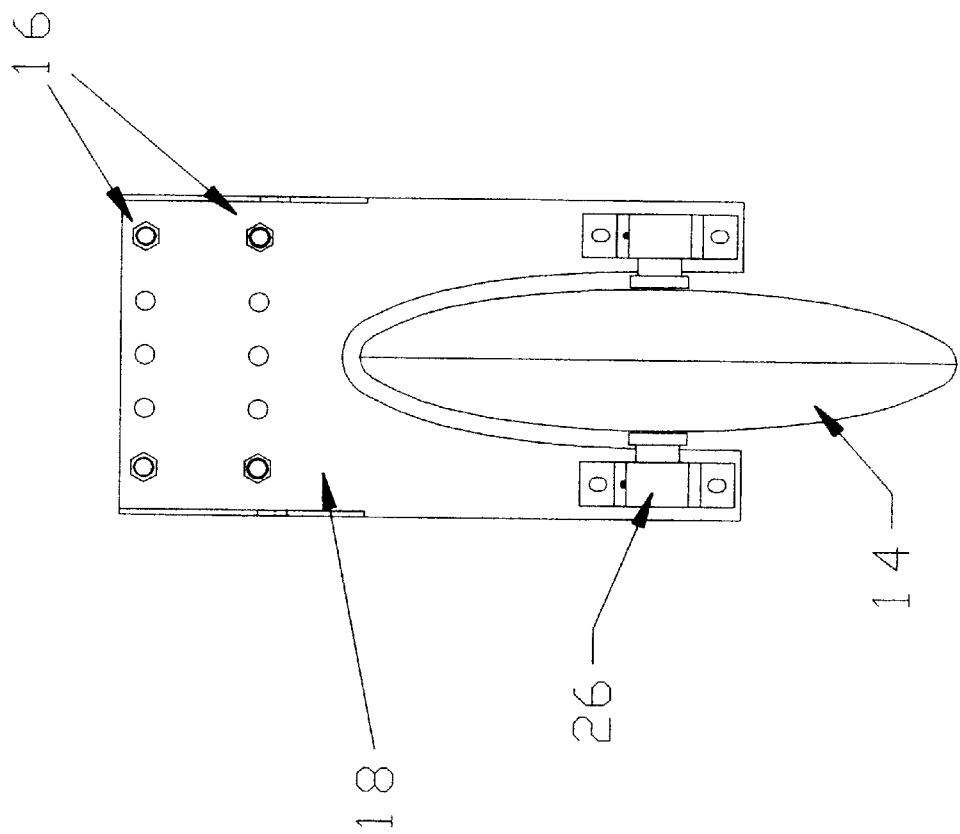
FIG. 6 is a front elevation view of a lenticular disc and the lenticular disc frame.
Figure 7:
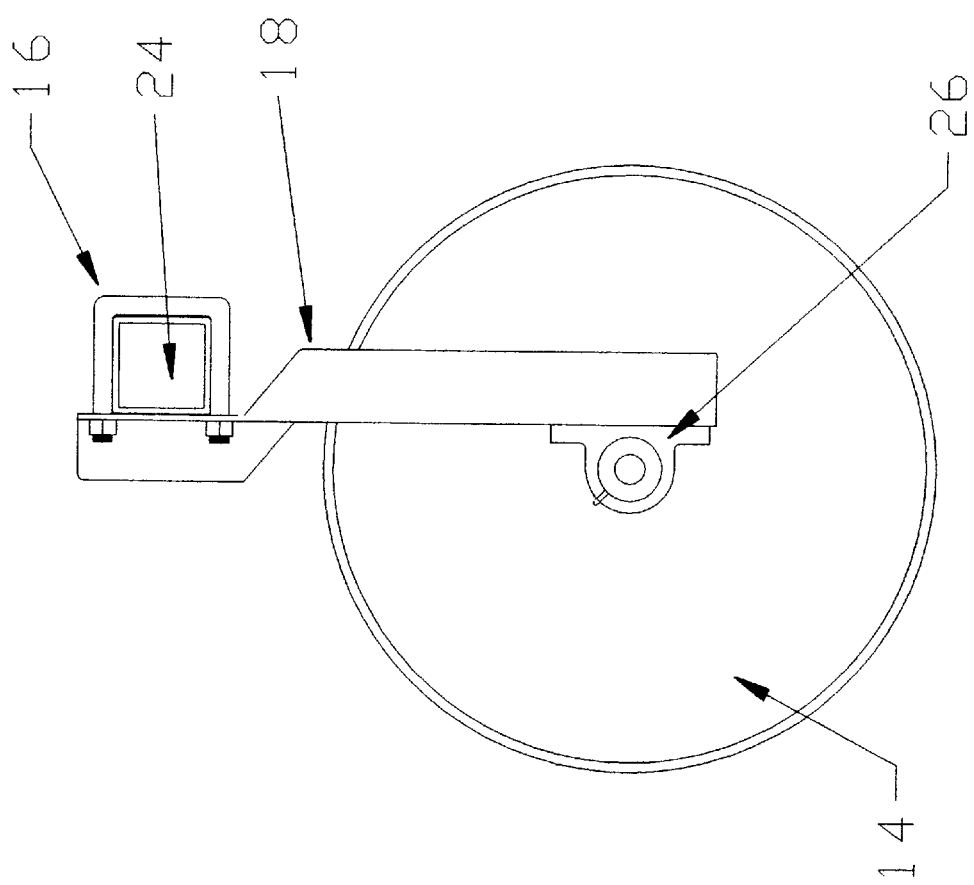
FIG. 7 is a side elevation view of a lenticular disc and the lenticular disc frame.

FIGS. 6 and 7 are detail views of the lenticular discs (14) and the lenticular disc support frames (18). The lenticular discs (14) are mounted within the lenticular disc support frames (18) by the use of bearing mounts (26), which enclose and secure the lenticular disc axle (28). The bearing mounts (26) are in turn secured to the lenticular disc support frame (18). FIGS. 6 and 7 also detail the manner in which the adjustable U-bolt mounts (16) secure the lenticular disc support frames (18) to the frame (20) of the front mounted row crop guidance system (10).

Figure 8:
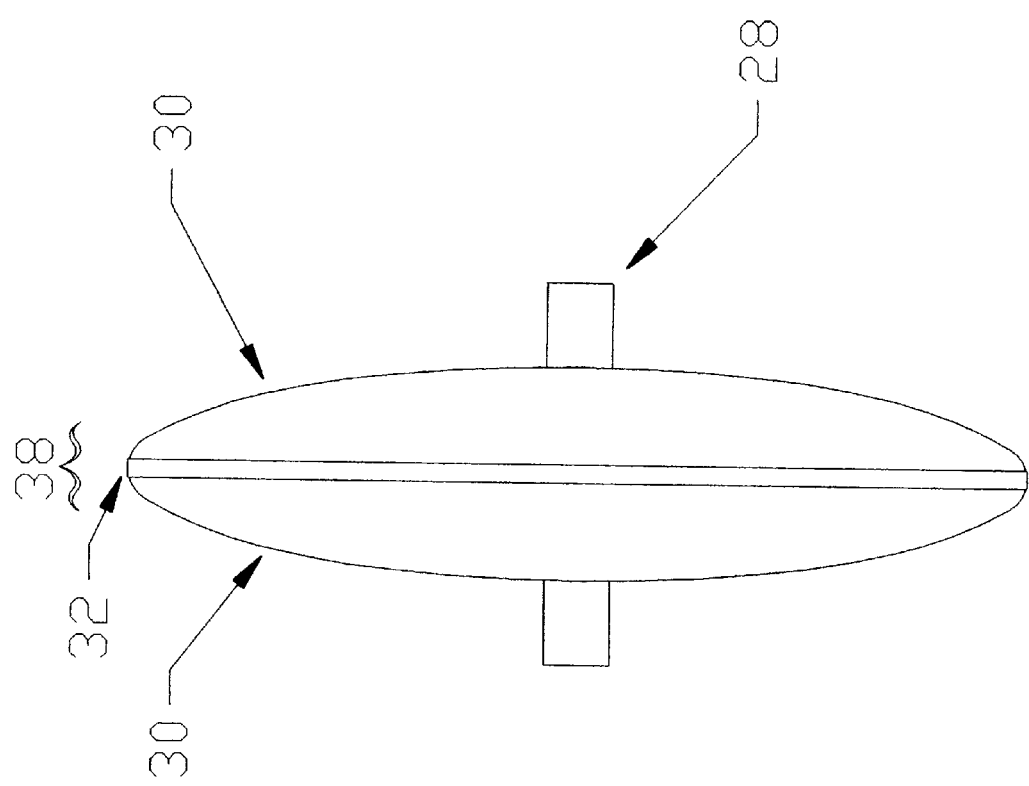
FIG. 8 is a front elevation view of a centrally ridged lenticular disc which is an option available for the present invention.
Figure 9:
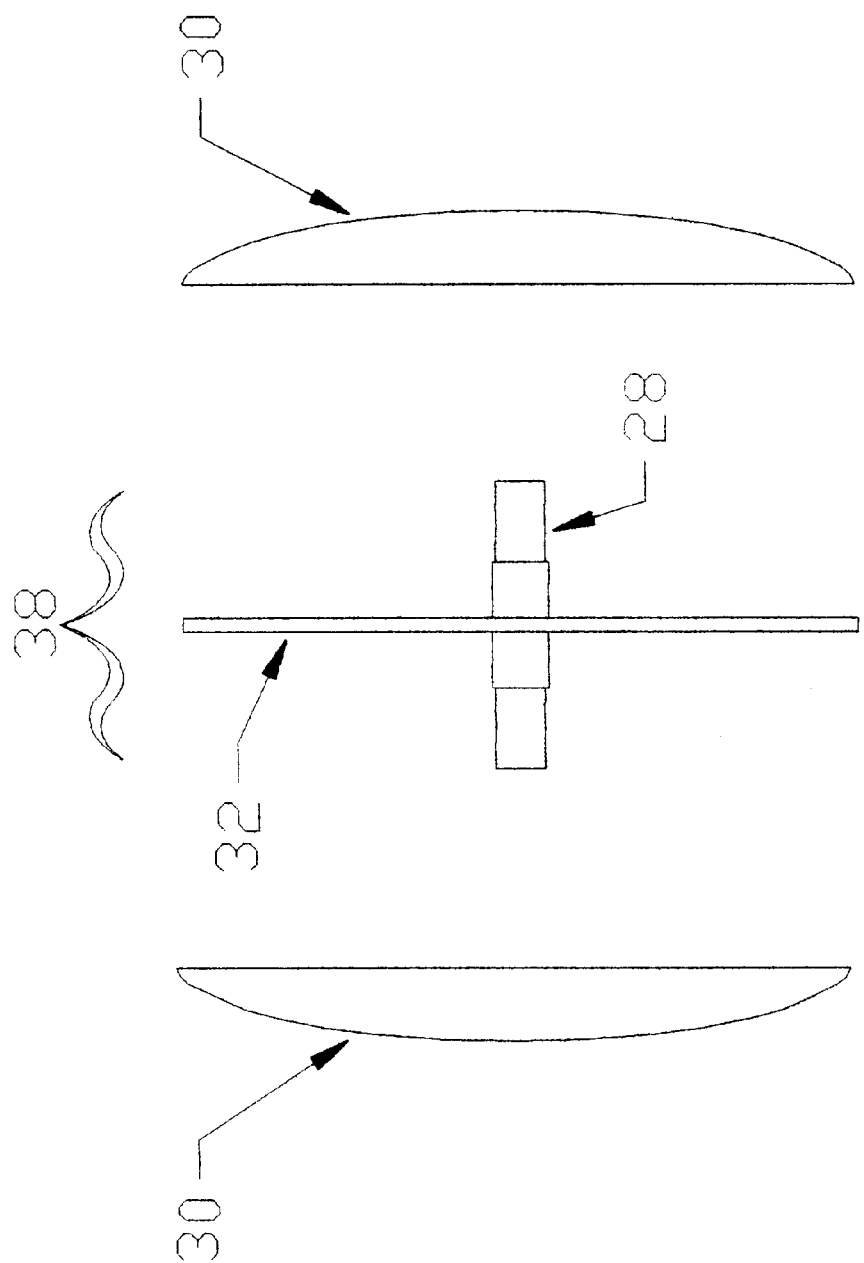
FIG. 9 is a front exploded view of a centrally ridged lenticular disc showing the separate components of this disc and their orientation to one another.
Figure 10:
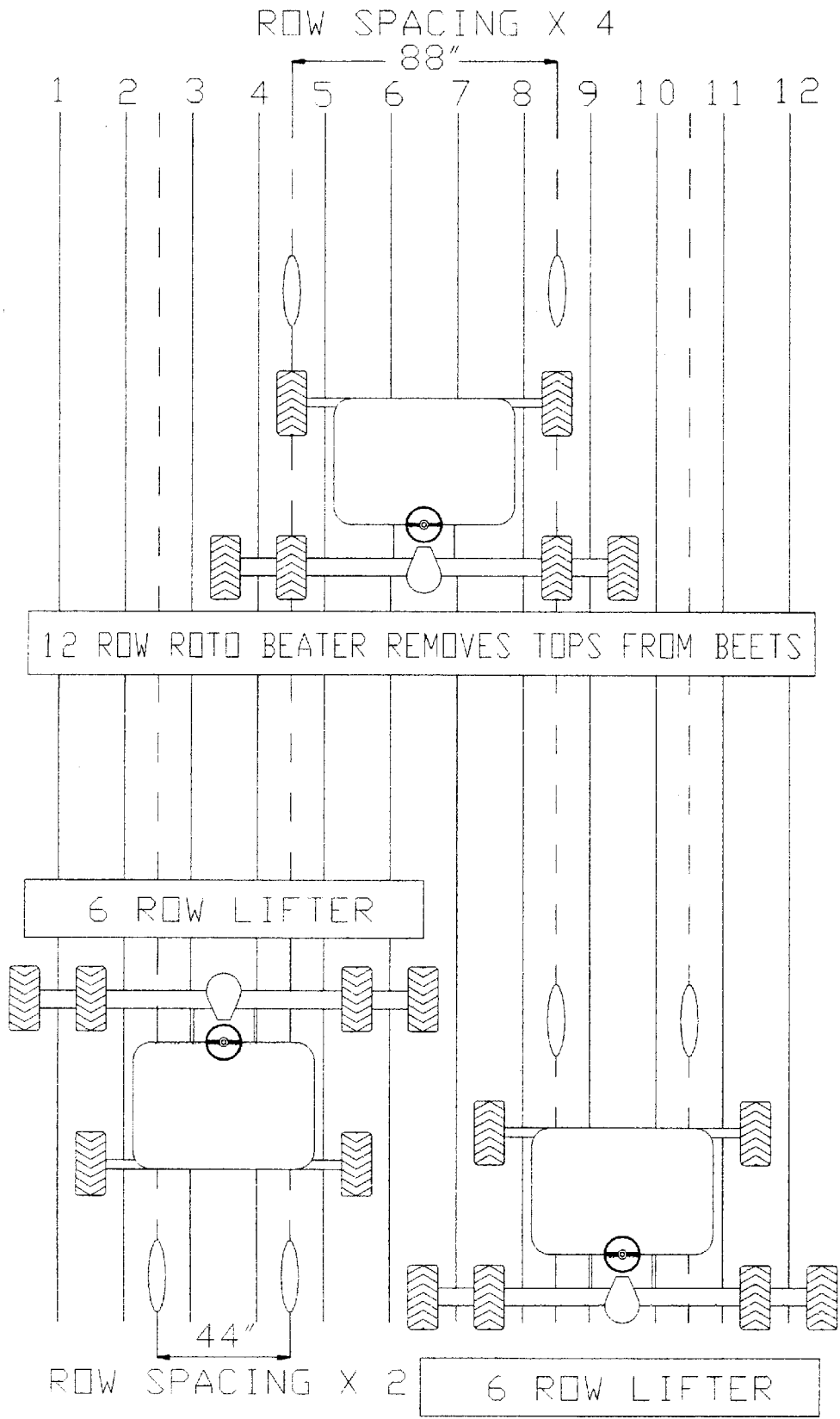
FIG. 10 is a chart showing the alignment of a front mounted row crop guidance system when a field is planted with a twelve row implement and later worked with a six row implement.

The optional centrally ridged lenticular disc (32) is detailed in FIGS. 8 and 9. This option is constructed by the fastening of two convex halves (30) to each side of a central metal disc (38), the outside diameter of which is larger then the outside diameter of the two convex halves (30). The effect of this is to create the centrally ridged lenticular disc (32). This feature enhances the tracking ability of the lenticular disc (14). FIG. 9 is an exploded view of the centrally ridged lenticular disc (32), showing the orientation of the convex halves (30), the lenticular disc axle (28, and the central metal disc (38) in the centrally ridged lenticular disc (32).

Although the present invention has been described in considerable detail with reference to certain preferred versions thereof, other versions are possible such as building a mount that is free to oscillate and can be mounted on the tractor proper as opposed to the axle. Therefore, the spirit and scope of the appended claims should not be limited to description of the preferred versions contained herein.

What is claimed is:

1. A mechanical front mounted row crop guidance system for use on a row crop tractor having a front and rear end said mechanical front mounted row crop guidance system comprising:

a left and right hinge mount bracket each of said brackets having a first and second mounting portion said brackets being capable of being fixedly attached to the front end of said row crop tractor;

a left and right perpendicular frame member each having a front and rear portion said frame members being pivotally connected at the rear portion to the respective first mounting portion of each of said hinge mount bracket and extending beyond said row crop tractors front end;

two hydraulic cylinders having a forward and rearward portion with each of said rearward portions being pivotally attached to the second mounting portion of each of said hinge mount brackets and the forward portion being pivotally attached to said perpendicular frame members between said perpendicular frame members front and rear portion;

a front cross member fixedly attached to the front portion of each of said perpendicular frame members; and said cross member further having a pair of adjustably mounted trench following guidance discs, said discs being substantially lenticular.

2. A mechanical front mounted row crop guidance system as in claim 1 further comprising a pair of lenticular disc support frames said frames being adjustably attached to said front cross member.

3. A mechanical front mounted row crop guidance system as in claim 1 wherein said hydraulic cylinders are in a position lower then said perpendicular frame members and mounted so as to exert force upward on said perpendicular frame members.

4. A mechanical front mounted row crop vehicle and guidance system comprising:

a row crop vehicle having a front and rear end with an axle across said front end said axle having a right and left front wheel;

a front mounted row crop guidance system
having a pair of trench following guidance discs, said discs being substantially lenticular, a framework for supporting said lenticular discs, said framework being adjustable so as to allow said lenticular discs to be placed at varying widths with respect to each lenticular disc, a means for pivotally mounting said framework to the front axle of said tractor and a means for engaging and disengaging said row crop guidance system, said means for engaging and disengaging being pivotally mounted to said axle of said row crop vehicle such that when said row crop system is engaged it can lift said row crop vehicle so as to relieve substantially all of the weight of said row crop vehicle from said right and left front wheel.

5. A mechanical front mounted row crop vehicle and guidance system as in claim 4 wherein said means for engaging and disengaging said guidance system is two individually mounted hydraulic cylinders.

\* \* \* \* \*